United States Patent
Kawashima et al.

(10) Patent No.: US 7,643,109 B2
(45) Date of Patent: *Jan. 5, 2010

(54) COLOR FILTER SUBSTRATE AND LIQUID CRYSTAL DISPLAY PANEL

(75) Inventors: Tomoya Kawashima, Tokyo-To (JP); Norihisa Moriya, Tokyo-To (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 269 days.

This patent is subject to a terminal disclaimer.

(21) Appl. No.: 11/355,510

(22) Filed: Feb. 16, 2006

(65) Prior Publication Data

US 2006/0181660 A1    Aug. 17, 2006

(30) Foreign Application Priority Data

Feb. 17, 2005   (JP)   ............................. 2005-039989

(51) Int. Cl.
  *G02F 1/1335* (2006.01)
  *G02F 1/1333* (2006.01)
  *G02F 1/1339* (2006.01)
(52) U.S. Cl. ..................... 349/106; 349/60; 349/97; 349/104; 349/110; 349/117; 349/118; 349/119; 349/120; 349/121; 349/153; 349/190
(58) Field of Classification Search ............... 349/60, 349/97, 104, 106, 117–121, 153, 181, 190, 349/110
See application file for complete search history.

(56) References Cited

U.S. PATENT DOCUMENTS

| 5,818,615 | A  | * | 10/1998 | Abileah et al. | ............. | 349/117 |
|---|---|---|---|---|---|---|
| 5,953,091 | A  | * | 9/1999 | Jones et al. | ................ | 349/129 |
| 7,050,131 | B2 | * | 5/2006 | Choi et al. | ................ | 349/110 |
| 7,379,141 | B2 | * | 5/2008 | Moriya | ..................... | 349/119 |
| 2001/0010574 | A1 | * | 8/2001 | Hiroshi | .................... | 349/141 |
| 2003/0122998 | A1 | * | 7/2003 | Iijima et al. | ................ | 349/106 |
| 2004/0057000 | A1 | * | 3/2004 | Hong | ....................... | 349/117 |
| 2004/0227894 | A1 | * | 11/2004 | Kim et al. | .................. | 349/145 |
| 2005/0142464 | A1 | * | 6/2005 | Moriya | ....................... | 430/7 |
| 2006/0164580 | A1 | * | 7/2006 | Ueda et al. | ................. | 349/117 |

* cited by examiner

*Primary Examiner*—Brian M. Healy
*Assistant Examiner*—Hung Lam
(74) *Attorney, Agent, or Firm*—Burr & Brown

(57) ABSTRACT

There are provided a substrate which has solved an unsatisfactory adhesion problem of a seal part in a liquid crystal cell comprising a retardation layer provided on the inner side of the cell, and a liquid crystal cell using the substrate. A color filter substrate includes a substrate 11, and at least a black matrix layer 12, a color filter layer 13, and a retardation layer 14 stacked on the substrate 11. The black matrix layer 12 and the color filter layer 13 are stacked on the substrate it while providing a margin around the periphery of the substrate 11. The retardation layer 14 is stacked on the black matrix layer 12 and the color filter layer 13 in a larger area than the area where the black matrix layer 12 and the color filter layer 13 are stacked. The substrate 11 in its margin, where neither the black matrix layer 12 nor the color filter layer 13 is stacked, is a predetermined seal area.

7 Claims, 3 Drawing Sheets

COLOR FILTER SUBSTRATE AND LIQUID CRYSTAL DISPLAY PANEL

BACKGROUND OF THE INVENTION

1. Field of the Invention

The present invention relates to a color filter substrate, and a liquid crystal display panel comprising the color filter substrate stacked on a counter substrate through a seal material.

2. Background Art

A retardation film for controlling a phase difference has hitherto been used in liquid crystal displays. For example, in the reflection-type liquid crystal, display, in general, a linearly polarizing plate and a ¼λ retardation plate are used in combination to provide circularly polarized light. Further, in recent years, in a liquid crystal display of a homeotropic alignment mode widely used in liquid crystal TV applications, in order to reduce the dependency of display upon the angle of visibility, a retardation film having an optical axis perpendicular to the substrate and having a negative birefringence anisotropy (a negative C plate) and a retardation film having an optical axis horizontal to the substrate and having a positive birefringence anisotropy (a positive A plate) are used in combination. Many other retardation films are commercially available including view angle compensation films using discotic liquid crystals.

All the above conventional retardation films are applied to the outer side of the liquid crystal cell. In this case, for the reason that different retardation films, or a retardation film and a polarizing plate are applied to each other at a certain specific angle and for the reason that the refractive index of a pressure-sensitive adhesive for application is different from the refractive index of the retardation plate and the refractive index of the polarizing plate, external light reflection occurs at the lamination interface, leading to lowered display contrast.

In recent years, an attempt has been made to provide a retardation layer utilizing a liquid crystal material within a liquid crystal cell (Japanese Patent Laid-Open No. 48627/1998). Such liquid crystal materials usable herein include, for example, liquid crystalline polymers having a glass transition point and capable of freezing the liquid crystal structure at or below the glass transition temperature, and liquid crystalline monomers which can cause three-dimensional crosslinking in a liquid crystal layer state utilizing a reactive group such as an unsaturated bond in a molecular structure and consequently can freeze the liquid crystal structure. The liquid crystal materials can be applied by coating onto a base material having an aligning function. The retardation layer provided within the liquid crystal cell can eliminate the drawbacks of conventional retardation films of a type applied to the outside of the liquid crystal cell.

When a retardation layer is provided on the inner side of the liquid crystal cell, the retardation layer is provided on any one of a pair of substrates constituting the liquid crystal cell. Typically, the retardation layer is provided on the inner side of a color filter substrate with a color filter. The liquid crystal cell is constructed so that a color filter substrate and a counter substrate are provided in combination and a liquid crystal material is filled into between the substrates. Both the substrates race each other while providing a given space therebetween, and the peripheral part of the substrates are sealed with a seal material.

When a retardation film is provided on the outer side of the liquid crystal cell as in the prior art, both the substrates on their inner sides (liquid crystal material filling sides) are intimately contacted with each other through a seal material. When a retardation layer is provided on the inner side of the liquid crystal cell, however, for the retardation layer and the seal material, mutual positional relationship and mutual adhesion should be taken into consideration.

For example, in a color filter substrate, in fact, a black matrix layer is sometimes provided on the peripheral part of the display area for displaying an image. The reason why the black matrix layer is formed in a picture frame form is attributable to the production process, that is, is that, in the formation of a black matrix layer using a black pigment-containing resin composition or a thin film of a black metal such as chromium, the black layer is first provided on the whole area of the substrate followed by the removal of the black layer only in its part corresponding to the display part for patterning. This picture frame part functions to prevent light leakage. When a seal material is located in the black matrix layer iii its picture frame part, the adhesion between the substrate and the black matrix layer, the adhesion between the black matrix layer and the retardation layer, and the adhesion between the retardation layer and the seal material should be well ensured.

When a base material, a black matrix layer, a retardation layer, and a seal material participate in the part to be sealed, the adhesion between the substrate and the black matrix layer and the adhesion between the black matrix layer and the retardation layer are not always satisfactory. In particular, when the black matrix layer is formed of a black pigment-containing resin composition, in some cases, the adhesion between the substrate and the black matrix layer and the adhesion between the black matrix layer and the retardation layer are not sometimes satisfactory, often resulting in separation in the seal part.

SUMMARY OF THE INVENTION

The present inventors hive round that a problem of separation in a seal part can be solved by not providing a black matrix layer in a picture frame form in a seal part, or by minimizing the black matrix layer in a picture frame form, preferably by using a retardation layer provided in a black matrix layer-free place as a seal part. The present invention has been made based on such finding.

Accordingly, an object of the present invention is to provide a substrate which has solved an unsatisfactory adhesion problem or a seal part in a liquid crystal cell comprising a retardation layer provided on the inner side of the cell, and a liquid crystal cell using the substrate.

According to the present invention, there is provided a color filter substrate comprising: a substrate; and at least a black matrix layer, a color filter layer, and a retardation layer stacked on the substrate, wherein the black matrix layer and the color filter layer are stacked on the substrate so as to provide a margin around the periphery of the substrate, the retardation layer is stacked on the black matrix layer and the color filter layer in a larger area than the area where the black matrix layer and the color filter layer are stacked and the substrate in its margin, where neither the black matrix layer nor the color filter layer are stacked, is an area to be sealed.

In a preferred embodiment of the present invention, the black matrix layer, the color filter layer, and the retardation layer are stacked in that order on the substrate.

In a preferred embodiment of the present invention, the black matrix layer, the retardation layer, and the color filter layer are stacked in that order on the substrate.

In a preferred embodiment of the present invention, the area to be sealed includes an area where the retardation layer is stacked.

In another preferred embodiment of the present invention, the area to be sealed is an area where the retardation layer is stacked.

In a preferred embodiment of the present invention, the retardation layer is stacked so as to cover the whole area on the substrate.

According to the present invention, there is provided a liquid crystal display panel comprising: a color filter substrate and a counter substrate stacked on top of each other through a seal material; and a liquid crystal hermetically filled into between both the substrates, wherein the color filter substrate is the above color filter substrate, and the seal material is provided on an area to be sealed in the color filter substrate.

According to the present invention, the retardation layer is stacked so as to be wider than the area where the black matrix layer and the color filter layer are stacked, and the substrate in its margin where neither the black matrix layer nor the color filter layer are stacked, is provided as a part to be sealed. Therefore, in this part, the adhesion between the substrate and the retardation layer is ensured. As a result, a color filter substrate, which could solve an unsatisfactory adhesion problem of the seal part posed by the interposition of the black matrix layer and the color filter layer, can be realized.

DETAILED DESCRIPTION OF THE INVENTION

Figure 1:
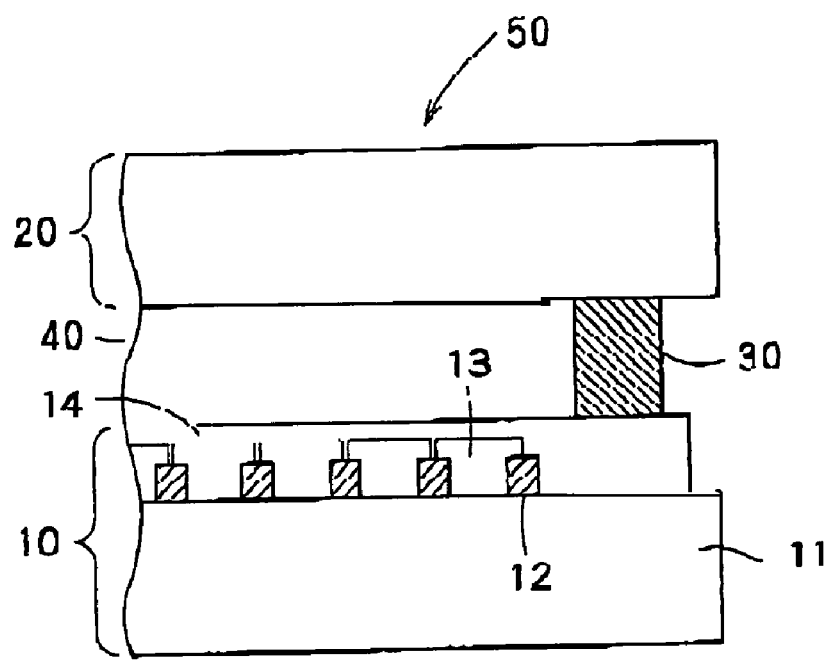
FIG. 1 is a diagram showing an example of a liquid crystal display panel and a color filter substrate.

FIG. 1 is a typical diagram showing a sectional structure of a color filter substrate and a liquid crystal display panel in a preferred embodiment of the present invention.

As shown in FIG. 1, a liquid crystal display panel 50 includes 2 color filter substrate 10 and a counter substrate 20 stacked on top of each other through a seal material 30 provided on the peripheral part of both the substrates, and a liquid crystal 40 is hermetically filled and sealed in the inner side of both the substrates. The color filter substrate 10 comprises a black matrix layer 12, a color filter layer 13, and a retardation layer 14 stacked in that order on a substrate 11. In the construction of the liquid crystal display panel 50, in general, for example, a transparent electrode layer and an aligning film are further stacked on the color filter substrate 10 side, and, for example, TFT and an aligning film are stacked oil a substrate on the counter substrate side. Further, a terminal and the like should be provided on both the substrates for externally supplying electric power.

Figure 2:
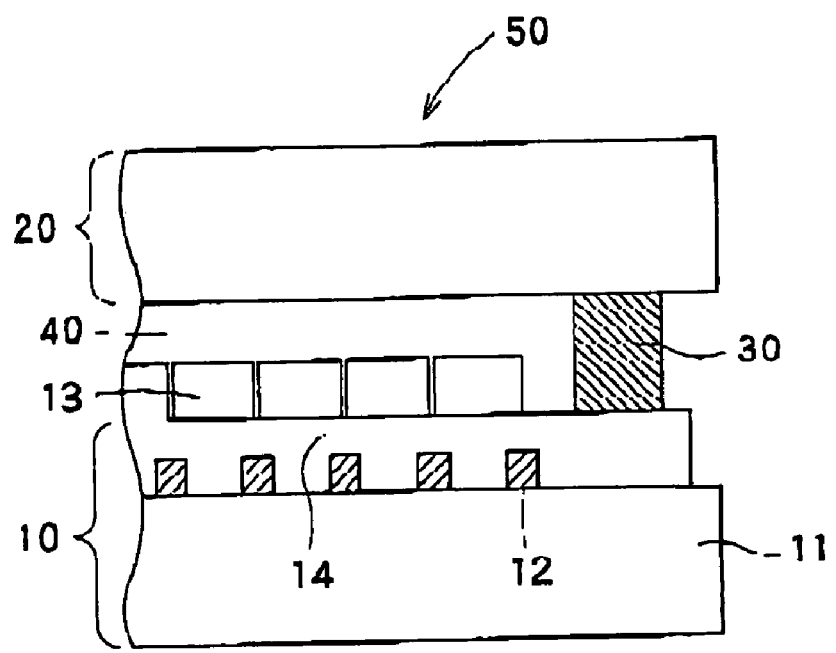
FIG. 2 is a diagram showing another example of a liquid crystal display panel and a color filter substrate.

FIG. 2 is a typical sectional structure of a color filter substrate and a liquid crystal display panel in another embodiment of the present invention.

The sectional structure shown in FIG. 2 is different from the sectional structure shown in FIG. 1 in the stacking position of the color filter layer 13. Specifically, in the construction shown in FIG. 2, a retardation layer 14 is first stacked on a black matrix layer 12, and a color filter layer 13 is stacked on the retardation layer 14. The other members are the same as those described above in connection with FIG. 1. Even when the order of stacking of the color filter layer 13 and the retardation layer 14 is changed, there is no difference in function of both the layers as the liquid crystal display panel and, thus, these layers may be stacked in any order.

In the liquid crystal display panel 50, two or more colors, generally three colors or four colors, are displayed. To this end, fine areas for respective predetermined colors are provided in the color filter layer 13. For example, fine areas for respective colors of red (R), green (G), and blue (B) are regularly arranged vertically and horizontally, for example, in the order of R, G, B, R, G, B, . . . to form an assembly. The black matrix layer 12 functions to partition fine areas for respective colors constituting the color filter layer 13 and, at the same time, functions to prevent leakage of external light from a gap part caused at the boundary of each area, unnecessary reflection and the like. The black matrix layer 12 is formed, for example, in a unidirectional or bidirectional lattice, network, or honeycomb form and is generally black. Although the outer shape of the black matrix layer is not always identical and varies depending upon applications, one example of the outer shape is a lattice form which has a horizontal to vertical ratio of, e.g., 3:4 or 9:16.

The black matrix layer 12 and the color filter layer 13 are stacked on a substrate which is somewhat larger than the size (display size) of a part (display part) which generally actually participates in the display. In this case, the black matrix layer 12 and the color filter layer 13 are stacked so that a margin is provided on the periphery of the substrate. The seal part on which the seal material is provided is set on the outer side of the display part so as not to hinder the display. For sealing under predetermined conditions, preferably, the black matrix layer 12 and the color filter layer 13 are not stacked outside the display size range.

As with the black matrix layer 12 and the color filter layer 13, the provision of a retardation layer 14 only in the display part suffices for satisfactory function. The present inventors, however, have found that the adhesion of the seal part in the liquid crystal display panel 50 is not significantly affected by whether or not the retardation layer 14 is present as a layer underlying the seal part, and, even when the retardation layer is present as a layer underlying the seal part, the adhesion is not deteriorated and good adhesion can be ensured. Accordingly, the provision of the retardation layer 14 in a display size covering the black matrix layer 12 and the color filter layer 13 suffices for contemplated results, and the retardation layer 14 may be provided in a larger size.

In FIGS. 1 and 2, the retardation layer 14 is stacked so as to extend to the outside of the part where the black matrix layer 12 and the color filter layer 13 are provided, and the seal material 30 is a part free from the black matrix layer 12 and the color filter layer 13 and is stacked on an area covered by the retardation layer 14. However, the following other embodiments may also be adopted.

FIGS. 3 to 6 each are a diagram showing a positional relationship of the layers constituting the color filter substrate 10 and the color filter substrate 10 in a liquid crystal display panel. In particular, FIGS. 3 to 6 show various embodiments in which the positional relationship of the retardation layer 14 and the seal material 30 relative to the substrate 11 is different. All of FIGS. 3 to 6 are enlarged typical views of an upper right corner part in the liquid crystal display panel when the liquid crystal display panel is observed from the counter substrate side. For convenience, such a state that the counter substrate 20 has been removed from the liquid crystal display panel 50 shown in FIGS. 1 and 2 is shown.

Figure 3:
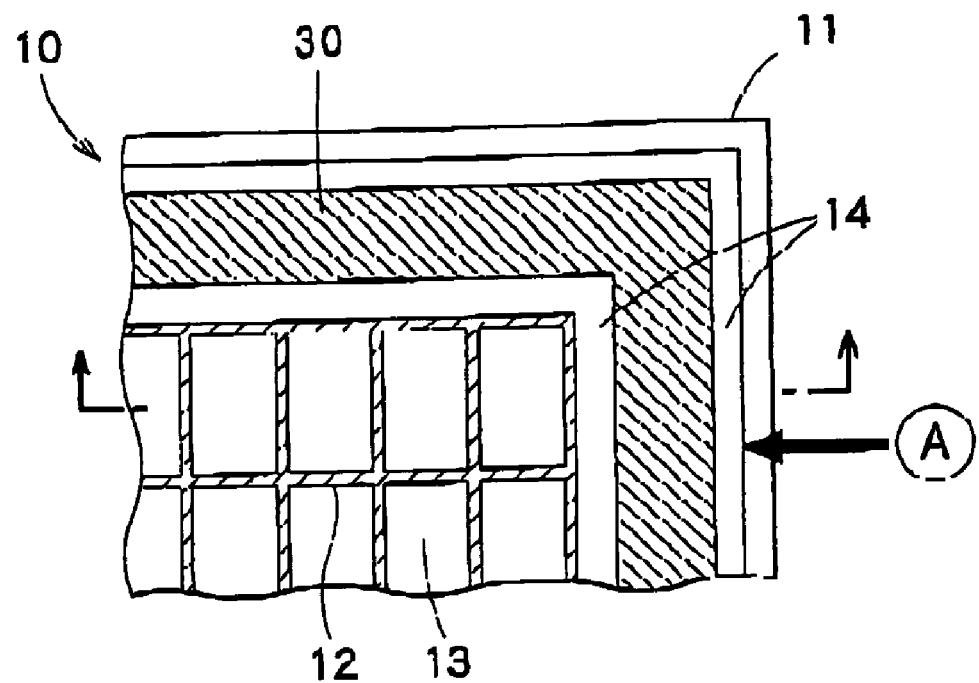
FIG. 3 is a diagram showing such a state that the retardation layer is also stacked on the outer side of a seal material.

In the embodiment shown in FIG. 3, a color filter layer 13 comprising assembled voids representing individual fine areas, and a black matrix layer 12 (shown as a thick hatched part) for partitioning individual fine areas in the color filter layer 13 are stacked on the substrate so as to provide a margin on the periphery of the substrate 11.

Here to clearly describe the position where the retardation layer 14 is provided, the peripheral part of the retardation layer is indicated by a thick line (or a thick dotted line), and, in FIGS. 3 to 6, the lines are indicated by alphabetical characters (A to D) surrounded by a circle.

In the embodiment shown in FIG. 3, the seal material 30 is provided on the outer side of the peripheral part of the black matrix layer 12 while providing a space from the black matrix layer 12. The periphery of the outer side of the seal material 30 is positioned inside the peripheral part of the retardation layer 14. That is, the seal material 30 is always stacked on the retardation layer 14. In FIG. 3, the section in a line provided with an arrow in its both ends corresponds to the section of the part of the color filter substrate 10 and the seal material 30 in the liquid crystal display panel 50 shown in FIG. 1.

Figure 4:
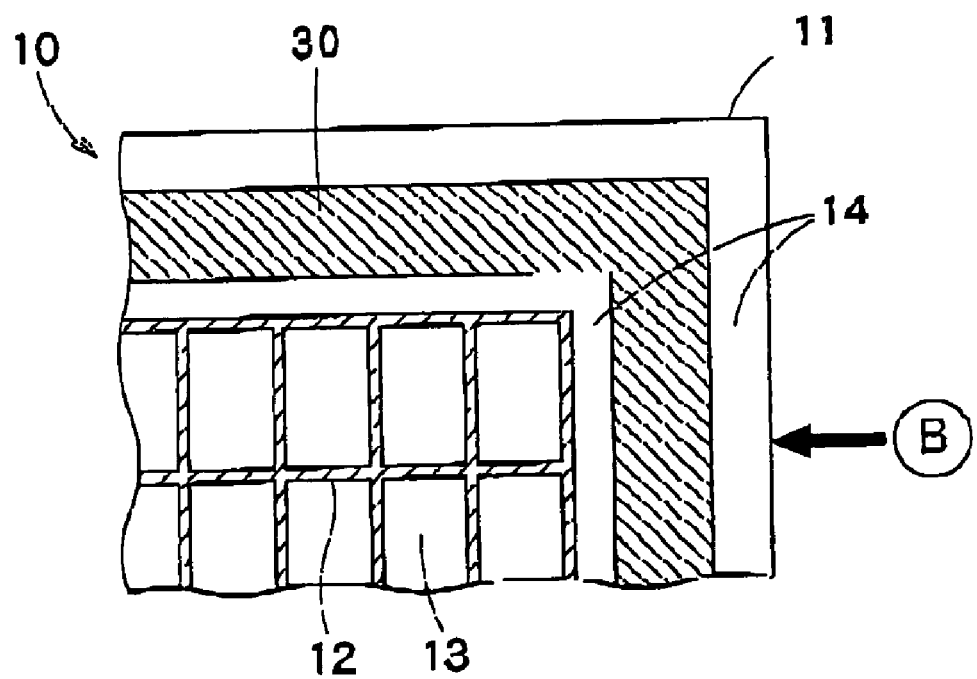
FIG. 4 is a diagram showing such a state that the retardation layer is stacked so as to extend to the end of a substrate.

In the embodiment shown in FIG. 4, the retardation layer 14 extends to the end of the substrate 11 (position B). The retardation layer 14 may be positioned in this way by applying a composition for retardation layer formation on the whole area of the underlying layer. Therefore, this embodiment is suitable for use in the case where the retardation layer is formed by a method which cannot regulate the application range, for example, a spin coating method.

Figure 5:
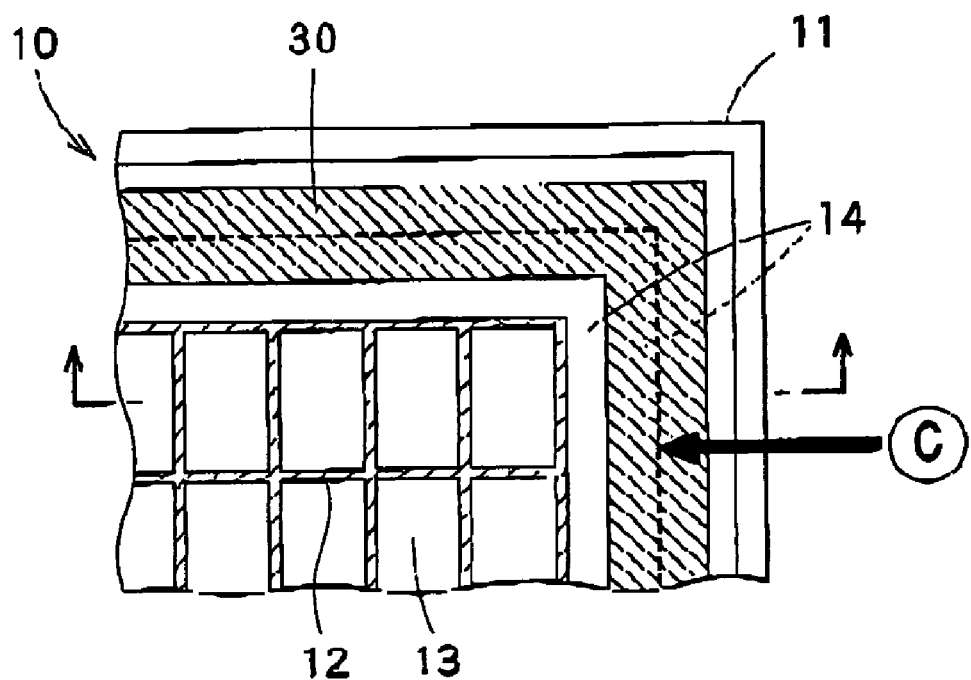
FIG. 5 is a diagram showing such a state that the retardation layer is stacked so as to extend to the center in the widthwise direction of a seal material.

In the embodiment shown in FIG. 5, as compared with the embodiment shown in FIG. 4, the outer shape of the retardation layer 14 is smaller, and the retardation layer 14 is disposed so that the periphery of the retardation layer 14 is located a position substantially at the middle of the outer peripheral edge and the inner peripheral edge of the seal material 30 (position indicated by C). In this embodiment, approximately the half of the width of the seal material 30 is provided on the retardation layer 14, and approximately the half of the outer side (that is, end side part of the substrate) of the seal material 30 is provided directly on the substrate without the intervention of the retardation layer 14 as the underlying layer.

Figure 6:
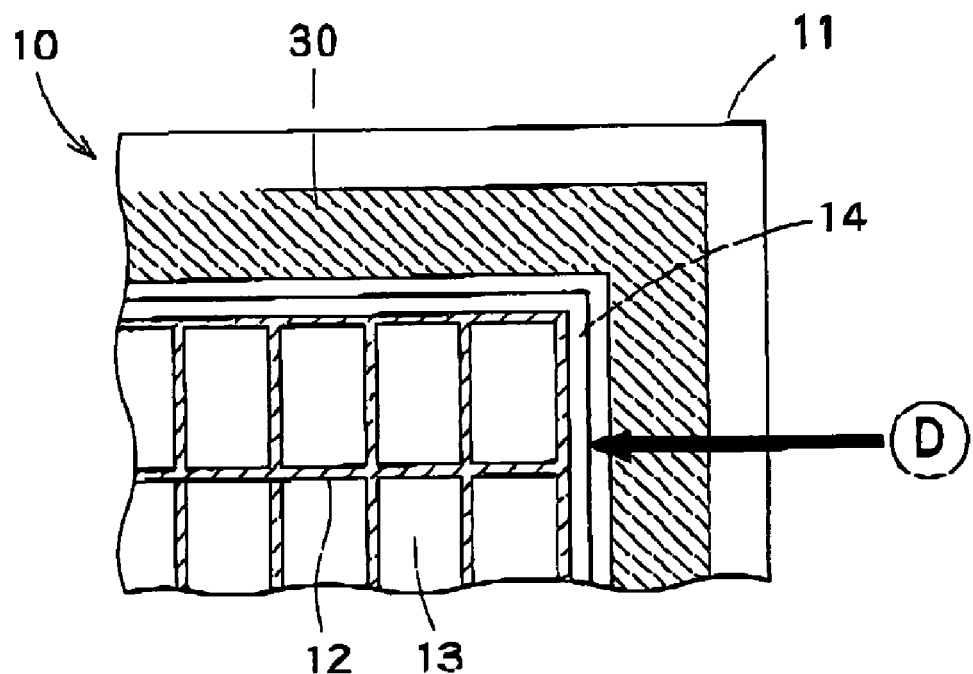
FIG. 6 is a diagram showing such a state that the retardation layer is stacked on a substrate so as to be located inward from a seal material.

In the embodiment shown in FIG. 6, the retardation layer 14 is disposed on the outer side somewhat from the periphery or the black matrix layer 12 (position indicated by D). The seal material 30 is provided on the substrate in its margin where the retardation layer 14 is not provided. In this embodiment, the seal material 30 is stacked on the substrate without the intervention of the retardation layer 14 as the underlying layer.

In the embodiments described in connection with FIGS. 3, 5 and 6, the retardation layer 14 is provided on inner side of the peripheral part of the substrate 11. Therefore, in the formation of the retardation layer 14, the composition for retardation layer formation should be applied only in a predetermined range, or alternatively a method should be adopted in which the composition for retardation layer formation is applied in an area which is larger than the predetermined range (for example, in an area corresponding to the whole area of the substrate) and the unnecessary part should be then removed. The former method can be realized, for example, by a screen printing method or an ink jet recording method. On the other hand, the latter method can be realized, for example, by applying the composition for retardation layer formation in an area larger than the predetermined range, for example, by spin coating or flow coating, then photocuring the coating, and conducting dissolution development.

Each member constituting the color filter substrate according to the present invention will be described.

(1) Substrate

The substrate 11 is preferably formed of an inorganic base material such as glass, silicon, or quartz. The substrate 11 may also be formed of the following organic base material. Examples of organic base materials include acrylic materials such as polymethyl methacrylate, polyamide, polyacetal, polybutylene terephthalate, polyethylene terephthalate, polyethylene naphthalate, triacetylcellulose, or syndiotactic polystyrene or the like, polyphenylene sulfide, polyether ketone, polyether ether ketone, fluororesin or polyethernitrile or the like, polycarbonate, modified polyphenylene ether, polycyclohexene or polynorbornene resin or the like, or polysufone, polyether sulfone, polyallylate, polyamide-imide, polyetherimide, or thermoplastic polyimide. Further, conventional plastics may also be used as the organic base material. The thickness of the substrate is not particularly limited. For example, a thickness in the range of about 5 μm to several millimeters may be adopted dependent upon applications.

(2) Black Matrix Layer

The black matrix layer 12 may be roughly classified into "resin black matrix" formed from a resin composition containing a black colorant and a metal black matrix formed of a metal which is black or the like and has low reflectance (called "Cr black matrix" because it is typically formed of Cr).

The resin black matrix may be formed by applying a coating material-type resin composition over the whole area, once solidifying the coating, and then applying a photoresist for predetermined pattern formation, or by using a coating material-type photosensitive resin composition containing a black colorant to conduct coating, pattern-wise exposure and development. The resin black matrix does not always have good adhesion to the substrate. Therefore, when the black matrix layer 12 is a resin black matrix, preferably, the black matrix layer 12 is not provided as a layer underlying the seal material 30. The thickness of the black matrix is about 0.5 μm to 2 μm.

The metal black matrix may be, for example, a two-layer chromium black matrix having a laminate structure of CrOx/Cr, wherein x is any number and "/" represents stacking, or a three-layer chromium black matrix having a laminate structure of CrOx/CrNy/Cr, wherein x and y are any number, having further lowered reflectance. The above laminate structure may be formed, for example, by a method in which, if necessary, a thin film (f a metal, a metal oxide, a metal nitride or the like is formed by various methods such as vapor deposition, ion plating, or sputtering followed by patterning by photolithography. Other methods for the above laminate structure formation include an electroless plating method or a printing method using a black ink composition containing the metal, metal oxide, metal nitride or the like as a pigment.

The metal black matrix generally has high adhesion to the substrate. Therefore, when the black matrix layer is formed or a metal black matrix, the black matrix layer may be provided as a layer underlying the seal material 30. The thickness of the metal black matrix is about 0.2 μm to 0.4 μm.

(3) Color Filter Layer

The fine areas for respective colors constituting the color filter layer 13 may be formed In each opening of the black matrix layer 12. However, for convenience, the fine areas may bed formed in a strip form. The color filter layer is formed from a resin composition containing a colorant dissolved or dispersed therein, preferably containing a fine pigment dispersed therein. The color filter layer may be formed by preparing an ink composition which has been colored in a predetermined color, and conducting printing for each color pattern. More preferably, however, the color filter layer is formed by photolithography using a coating material-type photosensitive resin composition containing a colorant of a predetermined color. The thickness of the color filter layer is about 1 μm to 5 μm.

(4) Retardation Layer

The retardation layer 14 is formed of a liquid crystal material which has been solidified while retaining the aligned state. The retardation layer 14 may have a single layer structure or two or more layer structure according to need. The liquid crystal material for constituting the retardation layer may be a liquid crystal material having positive birefringence anisotropy or a liquid crystal material having negative birefringence anisotropy. A nematic liquid crystal having a rod-like structure may be mentioned as a liquid crystal material having positive birefringence anisotropy, and a discotic, liquid crystal having a disc structure may be mentioned as a liquid crystal material having negative birefringence anisotropy. These liquid crystal materials include liquid crystal monomers, liquid crystal oligomers, or liquid crystal polymers. From the viewpoint of curing while retaining the aligned state, preferred are polymerizable liquid crystals, especially polymerizable liquid crystal monomers, which are polymerized and cured upon exposure to ionizing radiations such as ultraviolet light and electron beam.

Since the retardation level and the alignment properties are determined by the birefringence Δn of liquid crystal molecules and the thickness of the retardation layer, Δn is preferably about 0.03 to 0.15. The chiral agent mixed into the nematic liquid crystal is not particularly limited so far as a desired spiral pitch is induced without sacrificing the liquid crystallinity of the liquid crystal material. Such chiral agents are low molecular compounds having a molecular weight of not more than 1500 and include compounds which have chirality in the molecule thereof and contains one or at least two asymmetric carbon atoms, compounds having an asymmetric point on a heteroatom such as chiral amine or chiral sulfoxi-5-de, or compounds having an axial asymmetrical and optically active site such as cumulene and binaphthol.

Regarding the liquid crystal material and optionally used chiral agent, curing while retaining the aligned state can be realized by preparing an ionizing radiation polymerizable liquid crystal composition containing a chiral agent, a polymerization initiator or the like, for example, in the case of a polymerizable liquid crystal monomer, for example, a photopolymerizable liquid crystal composition, coating the composition onto an object face, subjecting the coating to alignment treatment, and further exposing the treated coating an ionizing radiation (for example, exposure to ultraviolet light).

The polymerizable liquid crystal monomer may be one, for example, disclosed in Published Japanese Translation of PCT Publication No. 508882/1998, and the polymerizable chiral agent may be one, for example, disclosed in Japanese Patent Laid-Open No. 158638-1995.

Specifically, compounds represented by formulae (1) to (11) may be used as the polymerizable liquid crystal monomer, and compounds represented by formulae (12) to (14) are suitable as the polymerizable chiral agent.

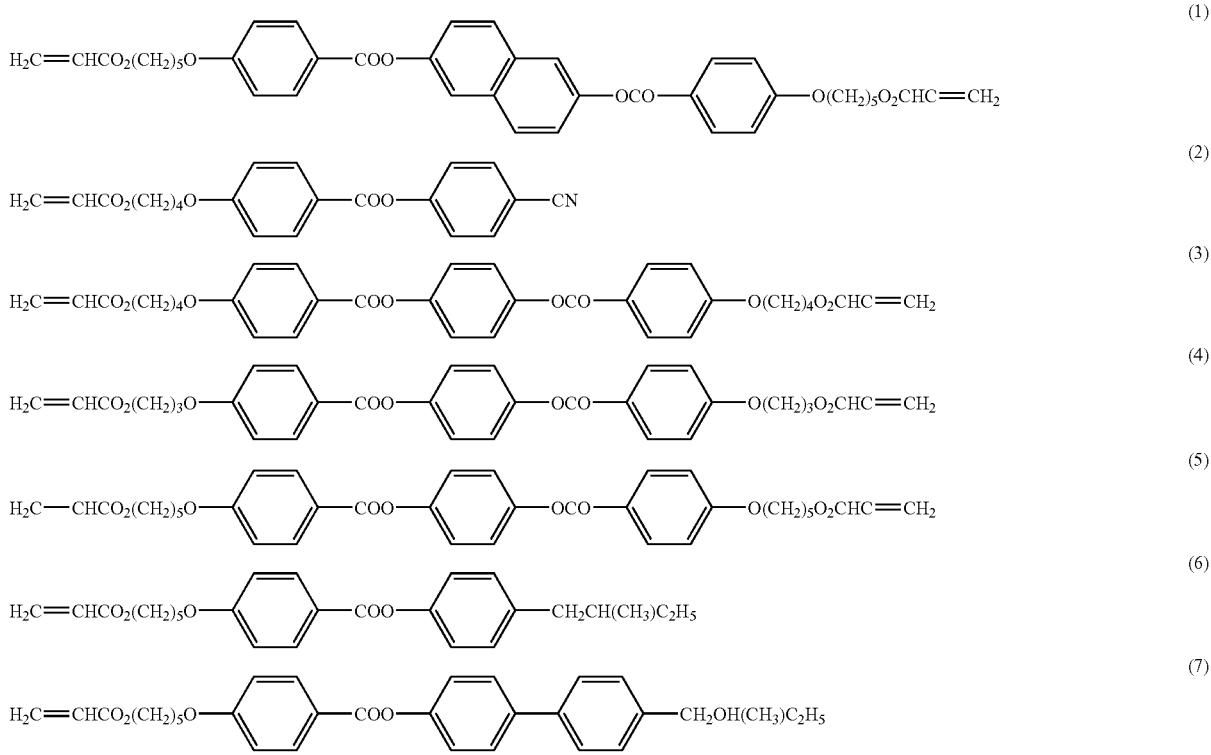

-continued

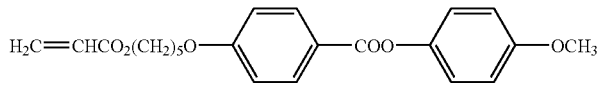
(8)

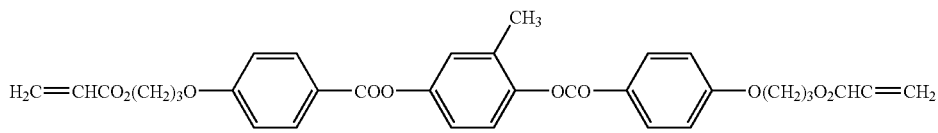
(9)

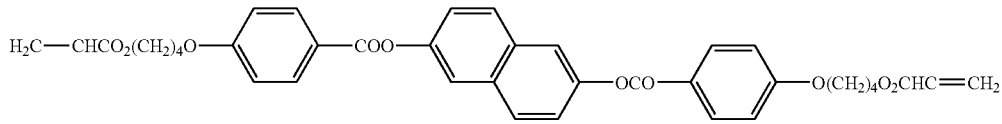
(10)

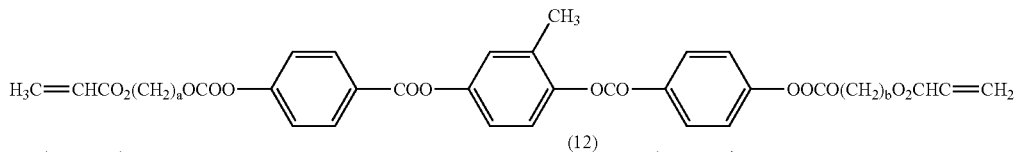
(11)

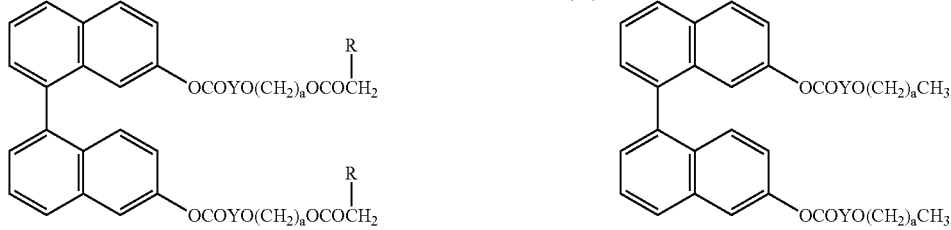
(12)
(13)

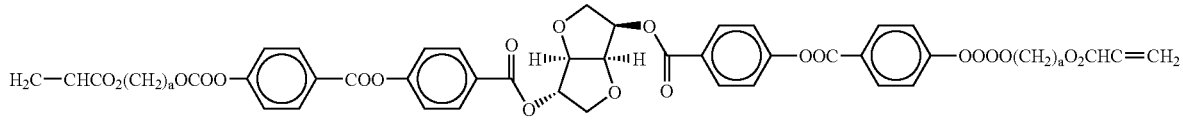
(14)

In formulae (11) to (14), a to c representing the number of methylene groups (chain length of alkylene group) each are an integer and are 2 to 5. a and b are each independently an integer of 2 to 12, more preferably 4 to 10, particularly preferably 6 to 9. c and d are each 2 to 12, more preferably 4 to 10, particularly preferably 6 to 9.

The retardation layer may be formed by providing the above ionizing radiation polymerizable liquid crystal composition, for example, the photopolymerizable liquid crystal composition, optionally dissolving the composition in a solvent or diluting the composition with a solvent, properly coating the composition by spin coating, die coating, slit coating, or other method, raising the temperature to a temperature at which a liquid crystal phase is developed to align the liquid crystal, and then applying an ionizing radiation (for example, ultraviolet light) for polymerization.

A silane coupling agent may be incorporated in the composition for retardation layer formation. The silane coupling agent preferably contains a hydrophilic functional group such as amine. Further, from the viewpoint of preparing a composition for retardation layer formation, the silane coupling agent is preferably soluble in an organic solvent. Specifically, the silane coupling agent may be one or at least two compounds selected from compounds which will be described below. The mixing amount is on such a level that will not sacrifice the alignment of the liquid crystal, that is, about 0.001% to 10% (on a mass basis), more preferably about 0.01 to 5%, based on the liquid crystal material.

Specific examples of silane coupling agents include N-2-(aminoethyl)-3-aminopropylmethyldimethoxysilane (Shin-Etsu Silicone "KBM-602" manufactured by The Shin-Etsu Chemical Co., Ltd.), N-2-(aminoethyl) 3-aminopropyltrimethoxysilane (Shin-Etsu Silicone "KBM-603" manufactured by The Shin-Etsu Chemical Co., Ltd.), 3-aminopropyltrimethoxysilane (Shin-Etsu Silicone "KBM-903" manufactured by The Shin-Etsu Chemical Co., Ltd.), γ-aminopropyltriethoxysilane ("TSL-8331", manufactured by GE Toshiba Silicone Co., Ltd.), N-(β-aminoethyl)-γ-aminopropyltrimethoxysilane ("TSL-8340"manufactured by G E Toshiba Silicone Co., Ltd.), N-(β-aminoethyl) γ-aminopropylmethyldimethoxysilane ("TSL-8345" manufactured by GE Toshiba Silicone Co., Ltd.), γ-(Z-aminoethyl)-aminopropyltrimethoxysilane ("SH-6020", manufactured by Dow Corning), and γ-(2-aminoethyl)-aminopropylmethyldimethoxysilane ("SH-6023" manufactured by Dow Corning).

Further, preferably, a photopolymerization initiator is added in the composition for retardation layer formation in such an amount that does not sacrifice the alignment of the liquid crystal. The addition of a radical polymerization initiator capable of generating free radicals upon exposure to ultraviolet light energy is preferred. The addition amount of the photopolymerization initiator is about 0.01% to 15% (on a mass basis), more preferably about 0.5% to 10%, based on the liquid crystal material.

Specific examples of photopolymerization initiators include benzyl (known also as "bibenzyol"), benzoin isobutyl ether, benzoin isopropyl ether, benzophenone, benzoylbenzoic acid, methyl benzoyl benzoate, 4-benzoyl-4'-methyldiphenyl sulfide, benzyl methyl ketal, dimethylaminomethyl benzoate, 2-n-butoxyethyl-4-dimethylamino benzoate, isoamyl p-dimethylamino benzoate, 3,3'-dimethyl-4-methoxybenzophenone, methylbenzoyl formate, 2-methyl.1-(4-(methylthio)phenyl)-2-morpholinopropan-1-one, 2-benzyl-2-dimethylamino-1-(4-morpholinophenyl)-butan-1-one, 1-(4-dodecylphenyl)-2-hydroxy-2-methylpropan-1-one, 1-hydroxycyclohexyl phenyl ketone, 2-hydroxy-2 methyl-1-phenylpropan-1-one, 1-(4-isopropylphenyl).2 hydroxy-2-methylpropan-1-one, 2-chlorothioxanthone, 2,4-diethylthioxanthone, 2,4-diisopropylthioxanthone, 2,4-dimethylthioxanthone, isopropylthioxanthone, and 1-chloro-4-propoxythioxanthone.

(5) Seal Material

The seal material may be any seal material so far as it is generally used in liquid crystal display panels. For example, a resin seal material comprising a resin material may be used as the seal material. The resin seal material may be one or at least two resins selected, for example, from bisphenol F diglycidyl ethers, bisphenol A diglycidyl ethers, resorcinol diglycidyl ether resins, phenol novolak epoxy resins, or triphenolmethane epoxy resins. Specific examples thereof include a seal material "XN-5A", manufactured by Mitsui Chemicals Inc. This seal material may optionally contain other components. Examples of other components include fine particles such as fine particles of carbon black, resin coated carbon black, iron oxide, titanium oxide, aniline black, and cyanine black, inorganic fillers such as talc and mica, silane coupling agents such as aminosilane and epoxysilane, solvents such as cellosolves and carbitols, and curing accelerators such as imidazoles, triphenylphosphine bicycloundecene, and tris-dimethylaminomethylphenol.

A liquid crystal display panel comprising a color filter substrate and a counter substrate stacked onto each other through a seal material 30 can be prepared by preparing a composition, by incorporating necessary components in the above resin, applying the composition by means such as printing onto a substrate 11 onto a retardation layer 14, or a part which lies across the top of the substrate 11 and the top of the retardation layer 14, optionally drying the coating to such an extent that does not hinder handling, then putting the color filter substrate on top of the counter substrate, pressing the assembly, and curing the composition by curing means such as heating or ultraviolet irradiation. In this case, after the application of the composition for seal material 30 formation onto the counter substrate 20 side, the color filter substrate 10 may be stacked. Alternatively, a method may also be adopted in which the composition is applied onto both the color filter substrate 10 side and the counter substrate 20 side.

EXAMPLES

A melt molded borosilicate thin sheet glass having a thickness of 0.7 mm (manufactured by Corning Incorporated, stock number: 7059) was provided as a substrate and was cleaned. Thereafter, a photoresist for black matrix formation was spin coated onto the substrate. The coating was then prebaked under conditions of temperature 190° C. and heating time 3 min. After the prebaking, ultraviolet light was applied to the coated face at an exposure of 100 mJ/cm$^2$ through a predetermined pattern. After the exposure, spray development was carried out with a 0.05% aqueous KOH solution for 60 sec, followed by post baking under conditions of temperature 200° C. and heating time 30 min. Thus, a 1.2 μm-thick black matrix having openings corresponding to pixels was formed. The black matrix was provided in an area in a preset display size range, and a margin where no black matrix was formed was provided on the substrate.

Further, as described below, a comparative assembly was also prepared in which a 20 mm-width continuous full-density blotted layer part (a fill part with a given thickness) was provided on the outer side of the display size.

Next, a photoresist for red pattern formation was spin coated on the substrate with the black matrix formed thereon, followed by prebaking under conditions of temperature 180° C. and heating time 15 min. Thereafter, alignment exposure was carried out with an ultraviolet light source at an exposure or 300 mJ/cm$^2$ though a predetermined pattern. After the exposure, spray development was carried out with a 0.1% aqueous KOH solution for 60 sec, and post baking was then carried out under conditions of temperature 200° C. and heating time 60 min. Thus, a 2.6 μm-thick red pattern was formed at positions corresponding to predetermined openings of the black matrix. Each or color patterns including the red pattern was formed in an area in the display size range.

Next, a 2.6 μm-thick green pattern was formed in the some manner as in the red pattern formation step, except that a photoresist for green pattern formation was used. Subsequently, a 2.6 μm-thick blue pattern was formed using a photo resist for blue pattern formation. The red, green and blue patterns were formed so as to be arranged in positions corresponding to different openings of the black matrix. Thus, a color filter layer was formed in which three-color patterns, i.e., a red pattern, a green pattern, and a blue pattern, were arranged.

In some cases, a transparent protective layer is provided on a color filter layer. In this Example, the provision of the transparent protective layer was omitted.

The photoresists used in the formation of the black matrix and the color filter layer, that is, a photoresist for black matrix formation, a photoresist for red pattern formation, a photoresist for green pattern formation, and a photoresist for blue pattern formation, were prepared by mixing a dispersion liquid composition and a clear resist composition together. The dispersion liquid composition was prepared by adding beads to a dispersion composition comprising a pigment, a dispersant, and a solvent, dispersing them in each other with a paint shaker as a dispergator for 3 hr, and removing the beads. The clear resist composition comprised a polymer, a monomer, an additive, an initiator, and a solvent. The photoresists had the following respective compositions (all "parts" are by mass).

Photoresist for black matrix formation

| | |
|---|---|
| Black pigment | 14.0 parts |
| (TM Black #9550, manufactured by Dainichiseika Color & Chemicals Manufacturing Co., Ltd.) | |
| Dispersant | 1.2 parts |
| (Disperbyk 111, manufactured by BYK-Chemie K.K.) | |
| Polymer | 2.8 parts |
| ((Meth)acrylic resin, stock number; VR 60, manufactured by Showa High Polymer Co., Ltd.) | |
| Monomer | 3.5 parts |
| (Polyfunctional acrylate, stock number; SR 399, manufactured by Sartomer) | |
| Additive (dispersion improver) | 0.7 part |

-continued

| | |
|---|---|
| (CHEMTREE-L-20, manufactured by Soken Chemical Engineering Co., Ltd.) | |
| Initiator | 1.6 parts |
| (2-benzyl-2-dimethylamino-1-(4-morpholinophenyl)-butanone-1) | |
| Initiator (4,4'-diethylaminobenzophenone) | 0.3 part |
| Initiator (2,4-diethylthioxanthone) | 0.1 part |
| Solvent (ethylene glycol monobutyl ether) | 75.8 parts |
| Photoresist for red pattern formation | |
| Red pigment (C.I. PR 254) | 3.5 parts |
| (CROMOPHTAL DPP Red BP, manufactured by Ciba Specialty Chemicals, K.K.) | |
| Yellow pigment (C.I. PY 139) | 0.6 part |
| (Paliotol Yellow D1819, manufactured by BASF) | |
| Dispersant (Solsperse 24000, manufactured by Zeneca Co., Ltd.) | 3.0 parts |
| Polymer 1 (See below) | 5.0 parts |
| Monomer | 4.0 parts |
| (Polyfunctional acrylate, stock number; SR 399, manufactured by Sartomer) | |
| Initiator | 1.4 parts |
| (Irgacure 907, manufactured by Ciba Specialty Chemicals, K.K.) | |
| Initiator | 0.6 part |
| (2,2'-bis(o-chlorophenyl)-4,5,4',5'-tetraphenyl-1,2'-biimidazole) | |
| Solvent | 80.0 parts |
| (propylene glycol monomethyl ether acetate) | |

Polymer 1 is a polymer prepared by adding 16.9% by mole of 2-methacryloyloxyethyl isocyanate to 100% by mole of a copolymer of benzyl methacrylate:styrene:acrylic acid:2-hydroxymethyl methacrylate=15.6:37.0:30.5:16.9 (molar ratio) and has a weight average molecular weight of 42500. The same shall apply hereinafter.

Photoresist for Green Pattern Formation

A photoresist for green pattern formation was prepared in the same mariner as in the photoresist for red pattern formation, except that the following pigments were used according to the following formulation instead of the red and yellow pigments in the photoresist for red pattern formation.

| | |
|---|---|
| Green pigment (C.I. PG 7) | 3.7 parts |
| (Seikafast Green 5316P, manufactured by Dainichiseika Color & Chemicals Manufacturing Co., Ltd.) | |
| Yellow pigment (C.I. PY 139) | 2.3 parts |
| (Paliotol Yellow D1819, manufactured by BASF) | |

Photoresist for Blue Pattern Formation

A photoresist for blue pattern formation was prepared in the same manner as in the photoresist for red pattern formation, except that the following pigments were used according to the following formulation instead of the red and yellow pigments and the dispersant in the photoresist for red pattern formation.

| | |
|---|---|
| Blue pigment (C.I. PB 15:6) | 4.6 parts |
| (Heliogen Blue L 6700F, manufactured by BASF) | |
| Violet pigment (C.I. PV 23) | 1.4 parts |
| (Hostaperm RL-NF, manufactured by Clariant) | |
| Pigment derivative | 0.6 part |
| (Solsperse 12000, manufactured by Zeneca Co., Ltd.) | |
| Dispersant (Solsperse 24000, manufactured by Zeneca Co., Ltd.) | 2.4 parts |

After a black matrix and a color filter layer were formed on a substrate, a photosensitive resin composition for C plate formation having the following formulation was spin coated onto the formed layers. After coating, the assembly including the substrate was placed on a hot plate and heated under conditions of temperature 80° C. and heating title 3 min to remove the solvent and to develop a liquid crystal structure in the coating film. Thereafter, the whole area of the coating film was exposed to ultraviolet light with a wavelength of 365 nm at an exposure of 50 J/cm$^2$. After the exposure, the assembly including the substrate was placed on a hot plate of a temperature of 230° C. for 30 min for heating to fully cure the coating film. Thus, a 3.0 μm-thick C plate retardation layer was formed to prepare a color filter substrate.

A color filter substrate (A), in which a black matrix was provided in an area in the display size range, and a comparative color filter substrate (B), in which a black matrix was provided continuously also on the outer side of the display size to provide a display size part and, further, a 20 mm-width full-density blotted layer part, were prepared. In both the color filter substrates (A) and (B), the retardation layer was formed so as to extend to the end of the substrate.

Photosensitive Resin Composition for C Plate Information

| | |
|---|---|
| Polymerizable liquid crystal monomer (which exhibits nematic liquid crystal phase represented by formula (11)) | 22 parts |
| Polymerizable chiral agent (represented by formula (14)) | 1.8 parts |
| Photopolymerization initiator (Irgacure 907, manufactured by Ciba Specialty Chemicals, K.K.) | 1.3 parts |
| Amine silane coupling agent (TSL-8331, manufactured by GE Toshiba Silicone Co., Ltd.) | 0.05 part |
| Solvent (chlorobenzene) | 75 parts |

Evaluation of Adhesion of Retardation Layer

In the color filter substrate thus obtained, the adhesion between the retardation layer and the layer underlying the retardation layer was evaluated. For the sample (A) in which the black matrix was provided in an area in the display size range, the stacked part of substrate/retardation layer on the outer side of the display size was evaluated. For the sample (B) in which the black matrix was provided on the outer side of the display size and a 20 mm-width full-density layer part was provided on the outer side of the display size, the stacked part of substrate/full-density blotted layer/retardation layer on the outer side of the display size was evaluated.

The adhesion was evaluated as follows. Eleven parallel linear cut flaws were formed on the surface of the retardation layer at intervals of 1 mm with a cutter knife. Subsequently, in a right-angled direction, eleven parallel linear cut flaws were formed at intervals of 1 mm in the same manner as described above. Thus, cut flaws in a network form which were 1 mm in both intervals of the vertical cut flaws and intervals of the horizontal cut flaws, were formed onto the surface of the retardation layer.

A pressure-sensitive adhesive tape (Mending tape #810, width 18 mm, manufactured by Sumitomo 3M Ltd.) was applied to the formed network part. Thereafter, the pressure-sensitive adhesive tape was pulled at a constant speed in a right-angled direction to separate the tape, and the state of the surface of the retardation layer was observed under a microscope (magnification: 50 times).

The evaluation results show that, for simple (A), the separation of the retardation layer from the cut flaw part was hardly observed. On the other hand, for sample (B), in some sites, separation of the retardation layer from the cut flaw part was observed. These results demonstrate that, although there is no problem of the adhesion between the substrate and the retardation layer, the interposition of a resin black matrix poses a problem of adhesion of the retardation layer.

What is claimed is:

1. A color filter substrate comprising:
    a substrate having a first surface and an opposed second surface; and
    at least a black matrix layer, a color filter layer, and a retardation layer stacked on the first surface of the substrate;
    wherein the black matrix layer and the color filter layer are stacked on the first surface of the substrate while providing a margin around the periphery of the first surface of the substrate;
    wherein the retardation layer is stacked with the black matrix layer and the color filter layer in a larger area than an area where the black matrix layer and the color filter layer are stacked;
    wherein the margin around the periphery of the first surface of the substrate, where neither the black matrix layer nor the color filter layer are stacked, defines an area to be sealed;
    wherein the color filter substrate is used for a liquid crystal display panel which comprises the color filter substrate and a counter substrate stacked on top of each other through a seal material, and a liquid crystal hermetically sealed between the substrates;
    wherein the retardation layer is located between the first surface of the substrate of the color filter substrate and the counter substrate in the liquid crystal display panel; and
    wherein the seal material is provided on at least pail of the retardation layer and the seal material does not contact the black matrix layer or the color filter layer.

2. The color filter substrate according to claim 1, wherein the black matrix layer, the color filter layer, and the retardation layer are stacked in that order on the first surface of the substrate.

3. The color filter substrate according to claim 1, wherein the black matrix layer, the retardation layer, and the color filter layer are stacked in that order on the first surface of the substrate.

4. The color filter substrate according to claim 1, wherein the area to be sealed includes an area where the retardation layer is stacked.

5. The color filter substrate according to claim 1, wherein the area to be sealed is an area where the retardation layer is stacked.

6. The color filter substrate according to claim 5, wherein the retardation layer is stacked so as to cover the whole area on the first surface of the substrate.

7. A liquid crystal display panel comprising: a color filter substrate and a counter substrate stacked on top of each other through a seal material; and
    a liquid crystal hermetically sealed between the color filter and counter substrates;
    wherein the color filter substrate is a color filter substrate according to claim 1; and
    wherein the seal material is provided on the area to be sealed of the color filter substrate.

* * * * *

UNITED STATES PATENT AND TRADEMARK OFFICE
CERTIFICATE OF CORRECTION

PATENT NO.       : 7,643,109 B2
APPLICATION NO.  : 11/355510
DATED            : January 5, 2010
INVENTOR(S)      : Tomoya Kawashima and Norihisa Moriya It is certified that error appears in the above-identified patent and that said Letters Patent is hereby corrected as shown below:

Abstract, Item (57)
    *Line 8:* change "it" to --11--

Column 2
    *Line 35:* change "hive" to --have--
    *Line 44:* change "or" to --of--

Column 3
    *Line 64:* change "oil" to --on--

Column 5
    *Line 53:* change "or" to --of--

Column 6
    *Line 55:* change "(f" to --of--

Column 7
    *Line 3:* change "In" to --in--

Column 8
    *Line 2:* change "beam" to --beams--
    *Line 31:* change "158638-1995" to --258638-1995--

Column 10
    *Line 56:* change "Z-aminoethyl" to --2-aminoethyl--

Column 12
    *Line 25:* change "or" to --of--
    *Line 27:* change "some" to --same--

Signed and Sealed this

Tenth Day of August, 2010

David J. Kappos
*Director of the United States Patent and Trademark Office*

CERTIFICATE OF CORRECTION (continued)
U.S. Pat. No. 7,643,109 B2

Column 13
    *Line 31:* change "droxymethyl" to --droxyethyl--
    *Line 37:* change "mariner" to --manner--

Column 14
    *Line 6:* change "title" to --time--

Column 16
    *Line 1:* change "pail" to --part--